United States Patent [19]
Yamaguchi et al.

[11] Patent Number: 5,240,350
[45] Date of Patent: Aug. 31, 1993

[54] APPARATUS FOR DETECTING POSITION OF UNDERGROUND EXCAVATOR AND MAGNETIC FIELD PRODUCING CABLE

[75] Inventors: Hiroaki Yamaguchi, Isehara; Shuji Arakawa, Hiratsuka; Tomoyuki Abe, Fujisawa; Yasuhiko Ichimura; Yasuo Kanemitsu, both of Hiratsuka, all of Japan

[73] Assignee: Kabushiki Kaisha Komatsu Seisakusho, Tokyo, Japan

[21] Appl. No.: 773,579
[22] PCT Filed: Mar. 8, 1991
[86] PCT No.: PCT/JP91/00318
§ 371 Date: Nov. 7, 1991
§ 102(e) Date: Nov. 7, 1991
[87] PCT Pub. No.: WO91/14079
PCT Pub. Date: Sep. 19, 1991

[30] Foreign Application Priority Data
Mar. 8, 1990 [JP] Japan .................... 2-59201

[51] Int. Cl.⁵ .................. E21B 47/09; E21D 9/06; G01C 15/00; G01V 3/12
[52] U.S. Cl. .................. 405/143; 405/138; 175/45; 324/346
[58] Field of Search .......... 405/138, 141, 143, 154, 405/184, 157; 299/1.05, 1.4; 175/45, 26, 61; 324/326, 339, 342, 346

[56] References Cited
U.S. PATENT DOCUMENTS

| | | | |
|---|---|---|---|
| 3,549,985 | 12/1970 | Penland | 324/326 |
| 4,387,340 | 6/1983 | Peterman | 324/326 |
| 4,678,371 | 7/1987 | Yamamura et al. | 405/154 X |
| 4,714,888 | 12/1987 | French et al. | 324/326 |
| 4,806,869 | 2/1989 | Chau et al. | 324/326 |
| 4,936,708 | 6/1990 | Perry | 405/184 |
| 5,014,008 | 5/1991 | Flowerdew | 324/326 |
| 5,107,938 | 4/1992 | Okamoto et al. | 405/184 X |

FOREIGN PATENT DOCUMENTS

| | | | |
|---|---|---|---|
| 428180 | 5/1991 | European Pat. Off. | 175/45 |
| 61-254793 | 11/1986 | Japan . | |
| 62-106313 | 5/1987 | Japan . | |
| 2-245690 | 10/1990 | Japan . | |
| 3-87612 | 4/1991 | Japan . | |

*Primary Examiner*—David H. Corbin
*Assistant Examiner*—John Ricci
*Attorney, Agent, or Firm*—Richards, Medlock & Andrews

[57] ABSTRACT

Magnetic field producers are disposed either at the leading portion of an underground excavator or at a reference position in front of the underground excavator. The magnetic field producers can be constituted by a plurality of rectangular loops disposed to run parallel to one another and to overlap one another. The rectangular loops can be individually excited sequentially or they can be simultaneously excited at different frequencies. The magnetic field produced by a magnetic field producer can be detected by a first magnetic field detector and by a second magnetic field detector disposed to the rear of the first magnetic field detector so that the inclination angle of the underground excavator can be obtained from the difference between the positions of the two detectors. A loop of a magnetic field producing cable can be covered by a non-magnetic metal member so that wear and disconnection are prevented. A double loop structure can be employed so that measurement can be performed even if one of the loops is disconnected.

20 Claims, 14 Drawing Sheets

APPARATUS FOR DETECTING POSITION OF UNDERGROUND EXCAVATOR AND MAGNETIC FIELD PRODUCING CABLE

FIELD OF THE INVENTION

The present invention relates to an apparatus for detecting the position of an underground excavator which is excavating underground, and, more particularly, to a position detection apparatus and its magnetic field producing cable for an underground excavator for use in guiding two underground excavators towards each other underground.

BACKGROUND ART

In a case where a submarine tunnel is formed, it is impossible to form many shafts from which underground excavators are started. Moreover, it is difficult to discharge excavated sediment. What is even worse, there arise many risks in a case where long distance excavation is performed by a single underground excavator. Accordingly, in a case where a submarine tunnel is formed, two underground excavators are started toward each other in order to shorten the distance of excavation made by the underground excavator. Then, the tunnels respectively excavated by the two underground excavators are joined to each other under the ground.

However, if the centers of the two underground excavators are deviated laterally or vertically at the junction, the two tunnels may not join together. Furthermore, if the centers of excavation of the two excavators are not aligned, the outbreak increases undesirably, the number of the excavation operations is increased and the quantity of agent to be injected is enlarged, causing the construction cost to be raised excessively. Therefore, the centers of the excavation made by the two excavators must be aligned to each other. Accordingly, the relative position between the two underground excavators must be detected to correct the positional deviation. Hitherto, the positional deviation taken place between the two underground excavators has been corrected by detecting the positional deviation between the two underground excavators and the designed tunnel line or the position with respect to a reference point such as the start point. Thus, the error correction is performed in accordance with the positional deviation thus-obtained.

Hitherto, the position of the underground excavator positioned underground has been obtained by the following methods:

(1) The position of the underground excavator from a reference point and the deviation from the designed line are obtained by a measurement performed underground by means of a transit or the like.

(2) An optical beam transmitting device for generating coherent light such as a laser beam is disposed in the shaft from which the underground excavator is started. The designed tunnel line is irradiated with the above-described device so as to read light spots on a target attached to the underground excavator. As a result, the position, the deviation and deflection angle of the underground excavator made from the start shaft are obtained.

(3) An azimuth gyro compass, a pressure type settlement gauge, an inclination gauge and a distance meter acting by making a segment length built up in the tunnel to be a reference are combined to one another so as to obtain the relative position from the reference position.

However, each of the above-described conventional methods for obtaining the position of the underground excavator encounter the following problems, causing a difficulty to arise when accurate underground joining is required.

A problem of a practical use arises in method (1) because the real-time measurement cannot be performed since many measuring points must be required when a bent tunnel is excavated. Furthermore, in method (2) there arises a necessity of moving the optical transmitting device to a proper position if the tunnel designed line is bent because the laser beams emitted from the start shaft cannot be applied to the target. Furthermore, the laser beam cannot be directly applied to cover the overall length of the designed line. Therefore, whenever the optical transmitting device is moved, the relative positional relationship among the target, the optical measuring device and the tunnel designed line must be actually measured. Then, the designed route must be obtained by performing calculations in accordance with the result of the measurement before the position, the deviation and the deflection angle of the underground excavator are obtained. As a result, there arise a problem in that the movement of the optical transmitting device, the measuring and the calculating operation takes excessive labor, causing the efficiency in the excavating operation to be deteriorated.

In addition, method (3) is not satisfactorily used to excavate a long distance tunnel due to the generated accumulated error. Also it is not suitable in a case where a curve having a small curvature radius is excavated or a tunnel in which curves are continued is excavated. In addition, the error is further enlarged in a case, for example, the underground joining operation, in which the relative position between two underground excavators is measured.

Accordingly, the assignee of the present invention has suggested a position detection apparatus (Japanese Patent Application No. 1-223035) in which a magnetic field producer is attached to either of the two underground excavators to be joined together underground, a magnetic field detector for detecting the magnetic field produced by the magnetic field producer is attached to the remaining underground excavator, the magnetic field detector is moved closer to the magnetic field producer by a boring device. A detection signal transmitted from the magnetic field detector and the amount of excavation made by the boring device are supplied to a calculating device so that the relative position between them are obtained.

That is, the position detection apparatus disclosed in Japanese Patent Application No. 1-223035, as shown in FIG. 28, arranged in such a manner that, when two rotational excavation type shield machines (underground excavators) 10a and 10b, which have moved to confront each other while excavating sediment, approach each other at a distance of about 30 to 40 m, a boring 12 is forwardly moved from a predetermined reference pint of a small consolidation type excavator (omitted from illustration) disposed on the front surface of the shield machine 10b toward the other shield machine 10a along the center of excavation of the shield machine 10b. As a result, it is brought into contact with the front surface 14 of the other shield machine 10a.

The boring 12 has, in the leading portion (in a portion of a predetermined length which is positioned slightly away from the leading portion) thereof, a magnetic field detector 16 serving as a position detection sensor (see FIG. 29). The above-described magnetic field detector 16 comprises a horizontal directional eccentricity amount detection sensor 16a and a vertical directional eccentricity amount detection sensor 16b. The horizontal direction eccentricity amount detection sensor 16a is composed of two magnetic sensors such as coils disposed on a horizontal plane to be perpendicular to each other. The vertical directional eccentricity amount detection sensor 16b is composed of two magnetic sensors such as coils disposed on a vertical plane to be perpendicular to each other.

On the other hand, a magnetic field producer 18 is disposed on the front surface 14 of the other shield machine 10a at a position corresponding to the reference point of the shield machine 10b. The magnetic field producer 18 is composed of a pair of magnetic field producing cables 18a and 18b forming rectangular loops which correspond to the horizontal directional eccentricity amount detection sensor 16a and the vertical directional eccentricity amount detection sensor 16b.

The magnetic field producing cables 18a and 18b are disposed in such a manner that their centers coincide with each other and they are perpendicular to each other. That is, the magnetic field producing cable 18a corresponding to the horizontal directional eccentricity amount detection sensor 16a is disposed in such a manner that its longitudinal direction is made to be in the vertical direction. The magnetic field producing cable 18b corresponding to the vertical directional eccentricity amount detection sensor 16b is disposed in such a manner that its longitudinal direction is made to be in the horizontal direction.

The position detection apparatus as described above is arranged in such a manner that electric currents (any of DCs, ACs or pulse currents may be used) are supplied to the magnetic field producing cables 18a and 18b so as to generate magnetic fields around them. The magnetic fields produced by the above-described cables 18a and 18b are formed into shapes directed in the forward direction of the shield machine 10a and symmetric between two major sides. Therefore, the magnetic field produced by the magnetic field producing cable 18a is detected by the horizontal directional eccentricity amount detection sensor 16a composed of a pair of magnetic sensors disposed on the horizontal plane in such a manner that they are perpendicular to each other. Then, the horizontal directional eccentricity amount of the boring 12 is detected in accordance with the difference in the intensity between the detected magnetic fields of the two magnetic sensors. Similarly, the vertical directional eccentricity amount of the boring 12 can be obtained by detecting the magnetic field produced by the magnetic field producing cable 18b by the vertical directional eccentricity amount detection sensor 16b.

However, since the position detection apparatus disclosed in Japanese Patent Application No. 1-223035 employs the rectangular loop cable as the magnetic field producer, the detection error becomes too large. That is, since the position detection apparatus disclosed in Japanese Patent Application No. 1-223035 utilizes technology of detecting a magnetic field produced by parallel cables having an infinite length or a length which is able to approximate it. Therefore, the magnetic field, which has been produced from another pair of the sides and which is not required to perform the detection, is also detected by the magnetic field detector, causing an error to be produced.

That is, in a case where the magnetic field producer can be assumed to be parallel cables having an infinite length, for example, in a case of a rectangular loop arranged in such a manner that the ratio b/a of the major side b and the minor side a is 100, the amount of eccentricity in a direction from the center of the major side and perpendicular to the major side is considered upon a result of a comparison made between the eccentricity amount x' obtained in accordance with the intensity of the magnetic field detected by the magnetic field detector and actual measurement result x. Since the inclination is 1 as shown in FIG. 30, the eccentricity amount x' obtained from the detected magnetic field becomes a value which is the same as the actual measurement result x.

However, if b/a is decreased, the intensity of the magnetic field detected by the magnetic field detector is affected by the magnetic field produced by the minor side a. As a result, the inclination is, as shown in FIG. 31, made to be smaller than 1 when the axis of abscissa stands for the actual measurement result x and the axis of ordinate stands for the eccentricity amount x' obtained in accordance with the intensity of the detected magnetic field. As a result, the eccentricity amount x' obtained from the magnetic field is made to be smaller than the actual measurement results x, causing the detection error to be generated.

Furthermore, since the magnetic field detector 16 is moved forward toward the magnetic field producer 18, the position detection sensor 16a, 16b are placed at a position away from the shield machine 10b. Therefore, if the boring 12 performs excavation in an inclined direction due to the change in the layer or the like, the above-described inclination cannot be detected. As a result, the positional deviation obtained by the magnetic field detector 16 does not coincide with the relative positional deviation between the two shield machines 10a and 10b. Therefore, a problem arises in that the positional deviation cannot accurately be detected. Similarly, a problem arises in a case where the two shield machines 10a and 10b make an inclined angle from each other.

Furthermore, the magnetic field producer 18 disclosed in Japanese Patent Application No. 1-223035 is arranged in such a manner that the magnetic field producing cables 18a and 18b are disposed on the front side cutter of the field machine 10a or the surface of the cutter bit attachment rotational base. Therefore, the magnetic field producing cables 18a and 18b come in contact with rocks and sediment and are thereby worn or disconnected when rocks or sediment are introduced into the shield machine 10a after the cutter or the cutter bit have rotated to excavate rocks or sediment. In order to prevent the above-described wear or the disconnection, the magnetic field producing cables 18a and 18b are disposed inside of the front surface of the shield machine 10a. However, an effective external magnetic field (that is, a leakage magnetic field) cannot easily be formed because the front surface of the shield machine 10a is made of steel, that is, magnetic material.

SUMMARY OF THE INVENTION

A first object of the present invention is to provide an apparatus for detecting the position of an underground excavator capable of improving the position accuracy of the underground excavator obtained in accordance with a detection signal supplied from a magnetic field detector.

A second object of the present invention is to accurately obtain positional deviation from a reference position even if shield machines to be joined are inclined.

Another object of the present invention is to prevent wear and disconnection of a loop cable which constitute a magnetic field producer.

In order to achieve the above-described objects, an apparatus for detecting the position of an underground excavator according to the present invention is arranged in such a manner that a magnetic field producer disposed at either the leading portion of the underground excavator or a position in front of the underground excavator and serving as a reference is constituted by a plurality of rectangular loops disposed to run parallel to one another while overlapping adjacent loops. Furthermore, a magnetic field detector is disposed at either of the remaining one of the leading portion of the underground excavator or the reference position, the magnetic field detector being arranged to detect the magnetic field produced by each loop. At least one of the magnetic field detector or the magnetic field producer is moved forward by a propulsive machine so as to cause the detector and producer to become closer to each other. The forward movement distance made by the magnetic field detector are supplied to a position calculator. The position calculator calculates the relative position of the underground excavator with respect to the reference position in accordance with the forward movement distance made by the propulsive machine and the detection signal supplied from the magnetic field detector.

As a result of the above-described structure, the ratio of the major side of the rectangular loop and the minor side of the same can be made to be a large value. Therefore, the effect of the magnetic field produced by the minor side can be reduced. As a result, the amount of displacement and the position of the underground excavator can accurately be obtained.

The magnetic field produced is composed of a common line and a plurality of parallel branch lines. One end portion of each of the branch lines is connected to the common line and the other end portion of each branch line is connected through a switch to a power source so as to be excited by switching over the switch. Furthermore, a plurality of the loops can be sequentially switched over by a control unit so as to be excited.

As a result, a loop which is being excited can easily be detected from a plurality of the loops.

Furthermore, each of the loops is connected to power sources which have different output frequencies so as to make the exciting frequency to be different, the detection signal supplied from the magnetic field detector is supplied to a filter so as to pass only a detection signal having a frequency which corresponds to the frequency which has excited the loop and the detection signal which has passed through the filter is supplied to the position calculator. It is preferable that the position calculator has a control portion for switching over the central frequency of the filter.

In a case where the structure is arranged as described above, the loop which generates the strongest magnetic field detected by the magnetic field detector can be detected among other loops even if the loops are simultaneously driven. Therefore, the position of the underground excavator can be detected in accordance with the magnetic field produced due to the above-described loop.

The magnetic field detector may be composed of a first magnetic field detector for detecting the magnetic field produced by the magnetic field producer and a second magnetic field detector disposed in the rear of the first magnetic field detector.

As a result of the above-described structure, the inclination of the underground excavator can be detected as well as the displacement between the same and the reference position from the position of the first magnetic field detector and the second magnetic field detector obtained from the detected magnetic field.

The magnetic field producing cable for an apparatus for detecting the position of an underground excavator is structured in such a manner that the magnetic field producing loop to be attached to the front surface of the shield machine is covered with a cover made of non-magnetic material.

In a case where the magnetic field producing cable is covered with the cover made of non-magnetic material, the wear and the disconnection of the magnetic field producing cable can be prevented. Furthermore, the effect upon the magnetic field produced by the magnetic field producing cable can be eliminated.

The magnetic field producing cable comprises a first rectangular loop and a second rectangular loop, the second rectangular loop is disposed at a projection position in the rear of the first rectangular loop, and they are independently supplied with electric currents. Each of the rectangular loops may be covered with non-magnetic material. The underground excavator may be an underground structure.

In a case where the magnetic field producer is constituted by two independent loops, the magnetic field can be produced by the second rectangular loop even if the first rectangular loop is disconnected. Therefore, generation of a problem in that the measurement cannot be performed can be prevent.

BEST MODE FOR CARRYING OUT THE INVENTION

Preferred modes of an apparatus for detecting the position of an underground excavator according to the present invention will now be described with reference to accompanying drawings.

Figure 1:
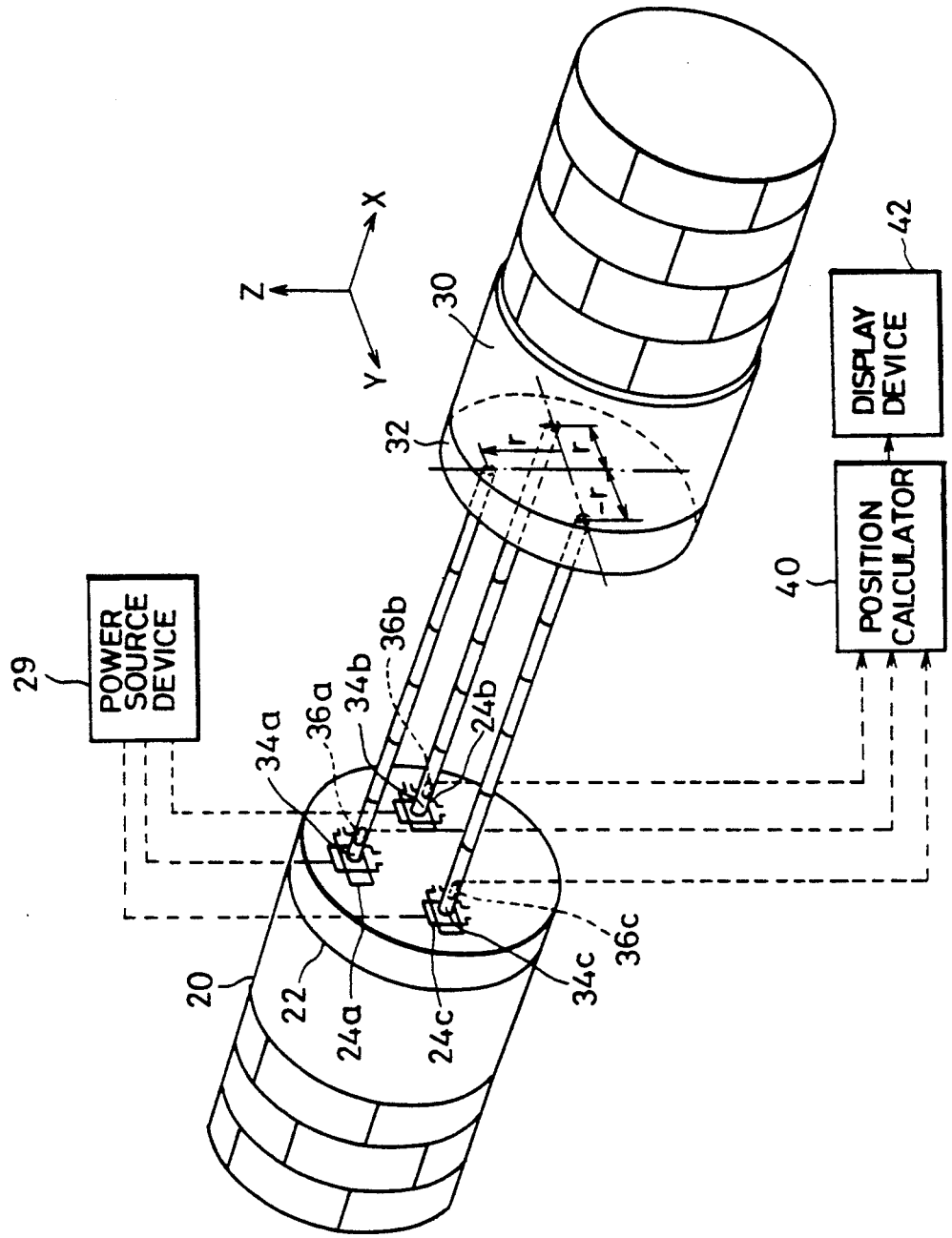
FIG. 1 illustrates the overall structure of a first mode of an apparatus for detecting the position of an underground excavator according to the present invention.

FIG. 1 illustrates the apparatus for detecting the position of an underground excavator according to a first mode of the present invention.

Referring to FIG. 1, underground excavators 20 and 30 respectively have cutter drums 22 and 32 each of which comprises a cutter (omitted from illustration).

Each of the cutter drums 22 and 32 is arranged to be rotatable and capable of stopping at an arbitrary rotational position. The underground excavators 20 and 30 move forward while rotating the cutter drums 22 and 32 so that sediment excavated by the cutter is introduced into the cutter drums 22 and 32 so as to be rearwardly conveyed by screw conveyors or the like. The above-described underground excavators 20 and 30 respectively perform the excavation in direction s in which they approach each other along a planned tunnel line from the individual start shafts so as to join the tunnels excavated.

The underground excavator 30 has, in the front portion thereof, consolidation excavation type small-diameter boring devices, 34a, 34b and 34c. The above-described boring devices 34a, 34b and 34c include, at the front portions thereof, corresponding magnetic field detectors 36a, 36b and 36c to be described later so that they serve as propulsion machines for moving the magnetic field detectors 36a, 36b and 36c forwardly or rearwardly.

Each of the above-described boring devices 34a, 34b and 34c is disposed in the rear of the cutter drum 32 of the underground excavator 30 in such a manner that they are positioned on a circle of a radius of r around the center (origin) of the underground excavator 30 at angular intervals of 90°. That is, the boring devices 34a, 34b and 34c are respectively disposed at (0, 0, r), (0, r, 0) and (0, −r, 0) assuming that X-axis stands from the excavating direction passing through the center of the underground excavator 30, Z-axis stands for the vertical direction and Y-axis stands for a direction perpendicular to X-axis and Z-axis. The cutter drum 32 has through holes (omitted from illustration) to correspond to the boring devices 34a, 34b and 34c in such a manner that the through holes are positioned in front of the boring devices 34a, 34b and 34c when the cutter drum 32 is stopped at a standard position. Therefore, the boring devices 34a, 34b and 34c are arranged in such a manner that they excavate semiment forward of the through holes when the cutter drum 32 is stopped at the standard position so as to forwardly move the magnetic field detectors 36a, 36b and 36c toward the other underground excavator 20.

On the other hand, the other underground excavator 20 serves as a positional reference for the underground excavator 30 and has magnetic field producers 24a, 24b and 24c, to be described later, on the front surface of the cutter drum 22 or on the inside of the cutter drum 22. The above-described magnetic field producers 24a, 24b and 24c are disposed to correspond to the boring devices 34a, 34b and 34c of the underground excavator 30 in such manner that the center of the magnetic field detectors 36a, 36b and 36c and the center of the boring devices 34a, 34b and 34c coincide with each other when the underground excavators 20 and 30 are positioned to confront each other while making their center lines coincide with each other and the cutter drums 22 and 32 are stopped at the standard positions.

Figure 2:
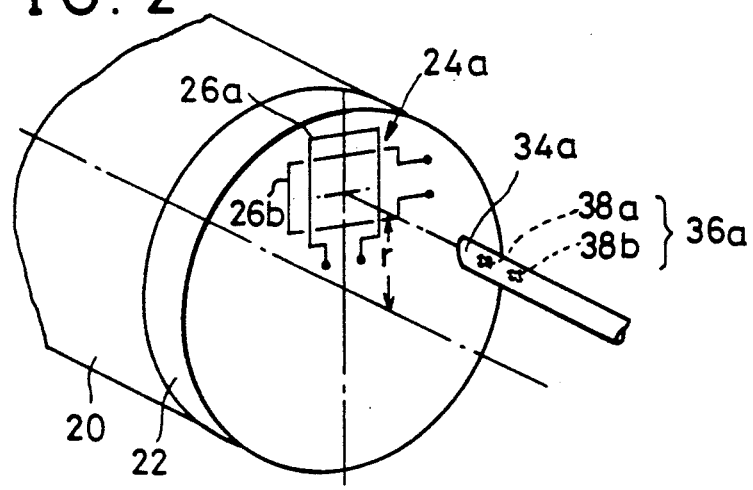
FIG. 2 is a partially enlarged view which illustrates the first mode.
Figure 3:
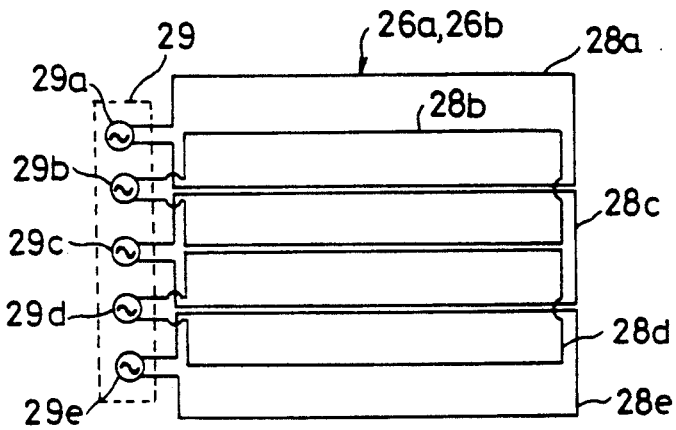
FIG. 3 illustrates the detailed structure of the magnetic field producer according to the first mode.

The magnetic field producers 24a, 24b and 24c are respectively connected to a power supply device 29 so that they generate magnetic fields when power is supplied from the power supply device 29. The magnetic field producers 24a, 24b and 24c are formed into the same structure in such a manner that, as described with reference to the magnetic field producer 24a shown in FIG. 2, a pair of loop portions 26a and 26b are perpendicular to each other. Each of the loop portions 26a and 26b is, as shown in FIG. 3, composed of a plurality of, for example, five, rectangular loop cables 28a to 28e. The loop cables 28a and 28e are respectively arranged to run parallel to the major side in such a manner that the adjacent loop cables overlap by half. Furthermore, each of the loop cables 28a to 28e is connected to AC power sources 29a to 29e of the power supply device 29 so that magnetic fields can be produced individually. The loop cables 28a to 28e constituting the loop portion 26a are respectively disposed in such a manner that their major sides run parallel to Z-axis of the underground excavator 20. Furthermore, the loop cables 28a to 28e which constitute the loop portion 26b are respectively disposed in such a manner that their major sides run parallel to Y-axis of the underground excavator 20.

The magnetic field detector 36a for detecting the magnetic field produced by the magnetic field producer 24a is formed into the same structure as that of each of the magnetic field detectors 36b and 36c and is composed of a Y-axis directional detection portion 38a and a Z-axis direction detection portion 38b (see FIG. 2) each of which is composed of a pair of detection coils positioned to be perpendicular to each other. The Y-axis directional detection portion 38a detects the intensity of the magnetic field produced by the loop portion 26a so as to transmit a detection signal to a position calculator 40 (see FIG. 1). Similarly, the Z-axis directional detection portion 38b detects the intensity of the magnetic field produced by the loop portion 26b so as to supply a detection signal to the position calculator 40.

The position calculator 40 calculates the relative distance between the underground excavator 30 and the underground excavator 20, the Y-axis direction, the amount of displacement in the Z-axis direction, the pitching angle made from the axial line (X-axis) of the underground excavator 20 and the rolling angle in accordance with the detection signals supplied from the magnetic field detectors 36a, 36b and 36c and the excavation amount realized by the boring devices 34a, 34b and 34c so as to transmit the results to a display device 42 so that they are displayed.

The relative position between the underground excavators 20 and 30 according to this made and structured as described above can be obtained as follows:

First, the cutter drums 22 and 32 of the corresponding underground excavators 20 and 30 are stopped at the standard positions. Then, the boring devices 34a, 34b and 34c provided for the underground excavator 30 are driven so as to perform the excavation until their leading portions reach the front surface of the underground excavator 20 which serves as the positional reference. As a result, the magnetic field detectors 36a, 36b and 36c are brought into portions adjacent to the magnetic field producers 24a, 24b and 24c. The fact that the leading portion of each of the boring devices 34a, 34b and 34c has reached the front surface of the underground excavator 20 can be detected in accordance with the excavation resistance or the like so that the distance of the excavation realized by each of the boring devices 34a, 34b and 34c is supplied to the position calculator 40.

When the magnetic field detectors 36a, 36b and 36c are brought to positions adjacent to the magnetic field producers 24a, 24b and 24c, the supply of electric current is sequentially switched over to the loop portion 26a of each of the magnetic field producers 24a, 24b and 24c or the loop cables 28a to 28e of the loop portion 26b so that magnetic fields are produced.

The Y-axis directional detection portion 38a of the magnetic field detector 36a sequentially detects the intensity of the magnetic fields produced by the loop cables 28a to 28e which constitute the loop portion 26a of the magnetic field producer 24a so as to generate a detection signal, which corresponds to the intensity of the magnetic field, to the position calculator 40. The Z-axis directional detection portion 38b detects the intensity of the magnetic fields produced by the loop cables 28a to 28e which constitute the loop portion 26b so as to generate a detection signal, which corresponds to the intensity of the magnetic field, to the position calculator 40.

When the detection signals are supplied to the position calculator 40 from the Y-axis directional detection portion 38a, it selects a signal having the highest signal level by subjecting the supplied detection signals to comparisons. The position calculator 40 detects a loop cable 28i which generates the magnetic field when the Y-axis directional detection portion 38a detects the signal displaying the highest level so that the position of the loop cable 28i with respect to the center of the loop portion 26a is calculated.

For example, in a case of this mode where the detection signal displaying the highest level is generated due to the magnetic field produced by the loop cable 28e, the position calculator 40 calculates distance ly between the center of the loop cable 28c and the center of the loop cable 28e so as to store the result of the calculation in a storage portion (omitted from illustration). Then, the position calculator 40 calculates the displacement δy of the Y-axis directional detection portion 38a with respect to the center of the loop cable 28e in accordance with an equation disclosed in Japanese Patent Application No. 165352 and Japanese Patent Application No. 1-223035 filed by the assignee of the present invention. The position calculator 40 calculates the displacement dy of the Y-axis directional detection portion 38a from the center of the loop portion 26a, that is, the degree of displacement of the center of the boring device 34a from the center of the magnetic field producer 24a in accordance with the following equation:

$$dy = \delta y + ly \quad (1)$$

Furthermore, the position calculator 40 similarly calculates the amounts of Y-axis and Z-axis directional displacements of each of the boring devices 34a, 34b and 34c from the center of the magnetic field producers 24a, 24b and 24c so as to calculate the amount and direction of displacement between the center of the underground excavator 30 and the center of the underground excavator 20. The results of the calculations are displayed on the display device 42.

Furthermore, the position calculator 40 obtains the pitching angle and the rolling angle of the underground excavator 30 made from the underground excavator 20 in accordance with the supplied amount of excavation realized by each of the boring devices 34a, 34b and 34c by using the method disclosed in Japanese Patent Application No. 1-223035 filed by the assignee of the present invention. The results thus-obtained are displayed on the display device 42.

As described above, according to this mode, the magnetic field producers 24a, 24b and 24c are constituted by the rectangular loop cables 28a to 28e. Therefore, the ratio (major side/minor side) of the major side and the minor side of each of the loop cables 28a to 28e can be enlarged. As a result, the effect of the magnetic field produced by the minor side of each of the loop cables 28a to 28e upon the intensity of the magnetic field detected by each of the magnetic field detectors 36a, 36b and 36c can be reduced so that the accuracy in detecting the amount of the displacement between the underground excavator 30 and the underground excavator 20 can be improved. Furthermore, a plurality of the loop cables 28a to 28e are disposed to run parallel to the major side and the adjacent loop cables overlap by half respectively. Therefore, even if the interval between the major sides is too narrow, a required detection range can be easily secured by disposing the loop cables by a number which corresponds to the maximum amount of displacement estimated.

Figure 4:
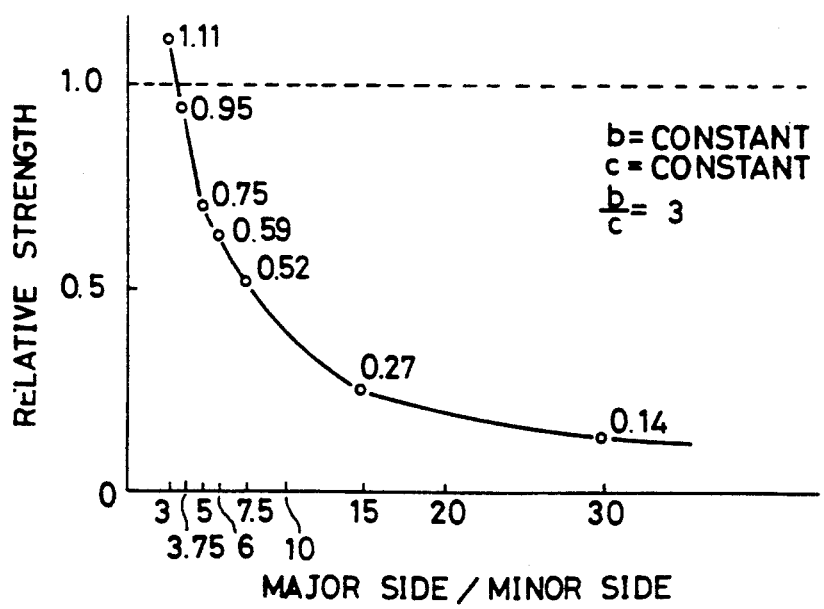
FIG. 4 is a graph which illustrates output signal levels from the magnetic field detector when the ratio of the major side and the minor side of the rectangular loop cable is changed.
Figure 31:
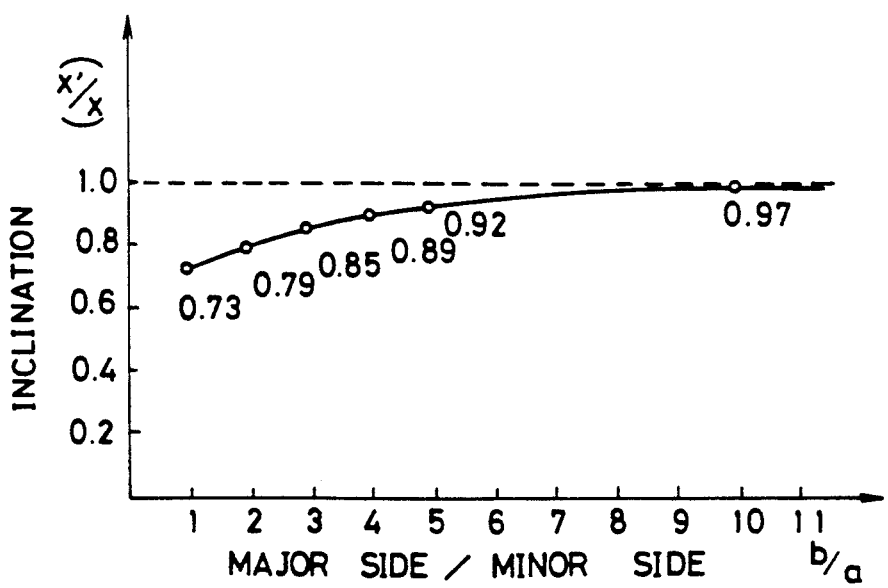
FIG. 31 illustrates an error between the eccentricity amount obtained by measuring the magnetic field corresponding to the change in the ratio of the major side and the minor side of the rectangular loop and the actual measured eccentricity amount.

The ratio of the major side and the minor side of each of the loop cables 28a to 28e can be arbitrarily selected. However, the output signal level (the reception intensity) from the magnetic field detector is lowered i the distance between the major sides of the loop cable is shortened. That is, assuming that the magnetic field detector is positioned at the center of a certain loop cable, the length of the major side of the loop cable is b=constant and the ratio between the major side and the distance c from the loop cable to the magnetic field detector is 3 (b/c=3), relative intensities with respect to b/a=∞ by changing the length (distance between the major sides) a of the minor side are as shown in FIG. 4. As a result, the received intensity deteriorates in accordance with shortening of the interval between a pair of major sides. Therefore, the ratio of the major side and the minor side of the loop cable is determined so as to obtain a required accuracy taking the distance between the magnetic field producer and the magnetic field detector, the length of the major side of the loop cable which can be attached to the underground excavator 20 and the amount of errors shown in FIG. 31 into consideration. The amount of the overlap made by the loop cables 28a to 28e may be smaller than half of the width. Referring to FIG. 4, the reason why the relative intensity at b/a=3 is larger than 1 is due to the effect of the magnetic field produced by the minor side a.

Figure 5:
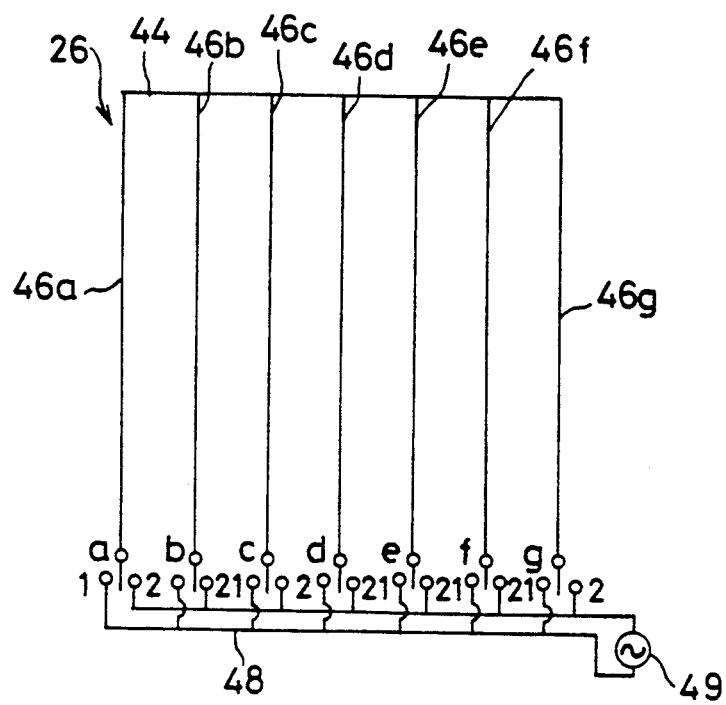
FIG. 5 illustrates the magnetic field producer for the position detection apparatus according to a second mode.

FIG. 5 illustrates a loop portion according to a second mode. Referring to FIG. 5, a loop portion 26 (26a, 26b) is composed of a common line 44 formed into a straight line and a plurality of branch lines 46a to 46g which are perpendicular to the common line 44 and run parallel to one another. End portions of the branch lines 46a to 46g are connected to the common line 44 at equal intervals, while other portions of the same are connected to movable contacts a to g of a switch 48 such as a relay. A fixed contact side of the switch 48 is connected to a single AC power source 49 so that a magnetic field producing electric current can be supplied to the loop portion 26.

With the loop portion 26 constituted as described above, a loop composed of the branch line 46a, the common line 44 and the branch line 46c is formed by switching over the switch 48 so as to connect the movable contact a to side 1 (or side 2) and connect the movable contact c to side 2 (or side 1). When the movable contact b is connected to side 1 (or side 2) and the movable contact d is connected to side 2 (or side 1), a loop composed of the branch line 46b, the common line 44 and the branch line 46d is formed. As a result, the effect obtainable from the loop cables 28a to 28e according to the above-described mode can be obtained.

The loop portion 26 constituted as described above can be partially omitted in the portion connected to the terminal of the switch 48 because of the symmetry. Furthermore, by connecting the movable contact a to side 1 (or side 2), connecting the movable contact g to side 2 (or side 1), connecting the movable contact b to side 1 (or side 2) or connecting the movable contact f to side 2 (side 1), a loop of an arbitrary size can be created. As a result, another effect can be obtained in that the time required to detect the position can be shortened by, for example, obtaining the schematic position by supplying power to the largest loop by a control unit before the size of the loop is reduced to obtain the accurate position.

Although the magnetic field detector 36 is moved forwardly by the boring device 34 according to the above-described mode, the magnetic field producer 24 may be moved forwardly. Another structure may be employed in which both of the magnetic field producer and the magnetic field detector 36 are moved forwardly. Although a structure is described according to the above-described mode in which the two underground excavators 20 and 30 are desired to be coupled to each other, the present invention can be applied to a case in which the boring device 34 for forwardly moving the magnetic field detector 36 is disposed at an arrival shaft and the position of the underground excavator with respect to the arrival shaft is obtained. Although the above-described mode is applied to a case in which the consolidation excavation type small-diameter boring device 34 is employed to serve as a propulsive machine for moving forwardly the magnetic field detector 36, the propulsive machine is not limited to this.

According to the above-described mode, a structure is described in which a plurality of the magnetic producers and the boring devices are employed. However, a structure may be employed in which either of the elements is employed by one so as to perform the measurement by changing its position with respect to the underground excavator by rotating the above-described elements.

Figure 6:
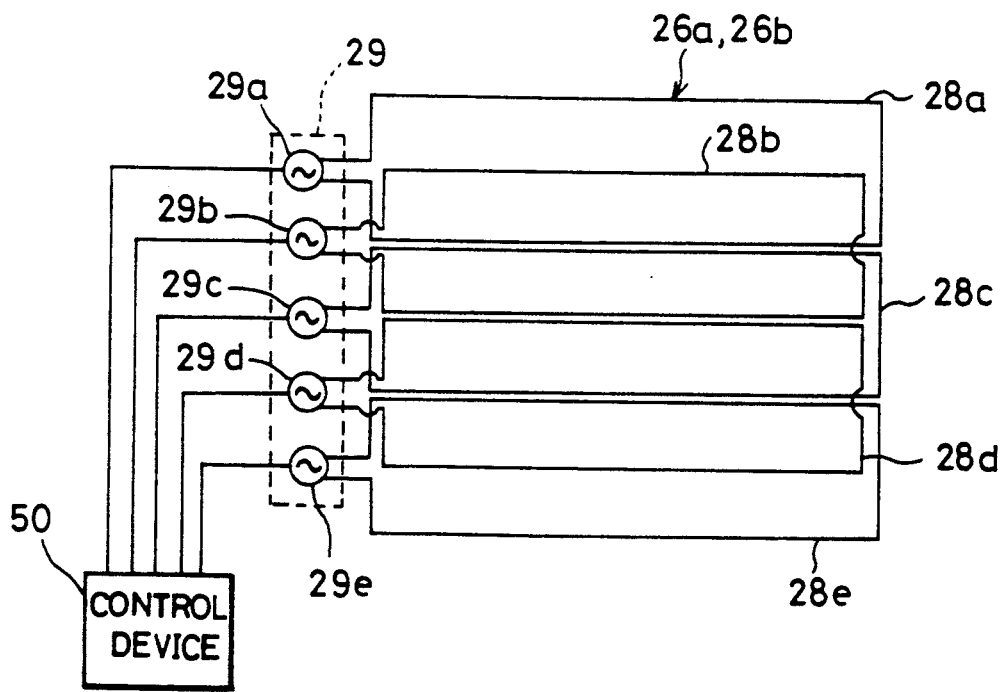
FIG. 6 illustrates the magnetic field producer from the position detection apparatus according to a third mode.

FIG. 6 illustrates a third mode.

Figure 7:
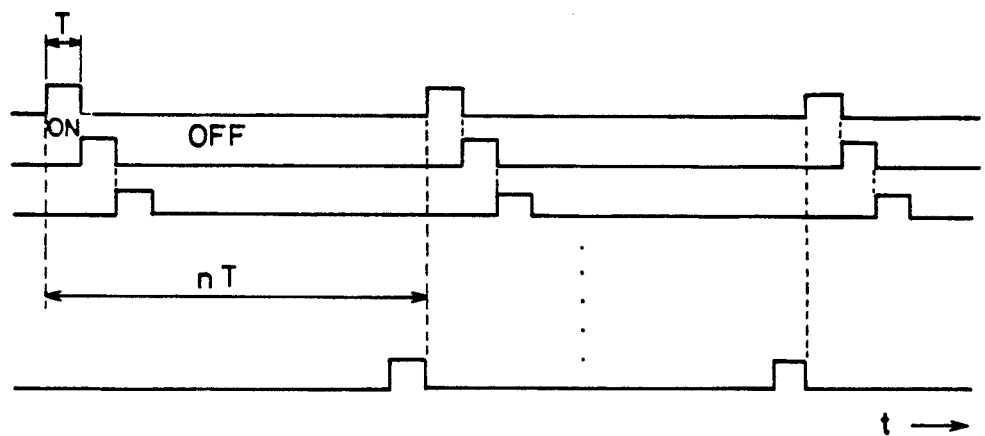
FIGS 7 and 8 illustrate a method of exciting a plurality of loop cables.
Figure 8:
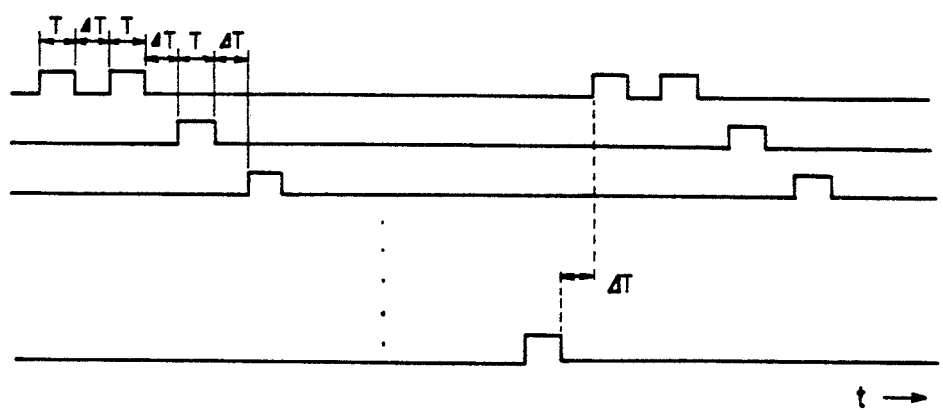

The loop cables 28a to 28e which constitute each of the loop portions 26a and 26b are respectively connected to the AC power sources 29a to 29e which constitute the power supply device 29. The above-described AC power sources 29a to 29e are respectively connected to a control unit 50 so that the control unit 50 supplies switching control signals to the AC power sources 29a to 29e. As a result, the loop cables 28a to 28e corresponding to the AC power sources 29a to 29e are sequentially switched over so as to be excited. The method of exciting the loop cables 28a to 28e, that is, an arbitrary pattern of a switching control signal to be supplied from the control unit 50 to the power source 29 may be employed. For example, as shown in FIG. 7, an arrangement may be employed in which the AC power sources 29a to 29e are sequentially switched over so as to be turned on for only time T. Another arrangement as shown in FIG. 8 may be employed in which a drive signal is transmitted at every ΔT, drive signals are, by two times, continuously supplied to the first AC power source 29a and a drive signal is supplied to the other AC power source by one time so that the first loop cable 28a can be distinguished. In addition, it may be driven for a time (for example, for nT seconds if it is the n-th loop cable) which is in proportion to the number (sequential order) of the loop cable.

Figure 9:
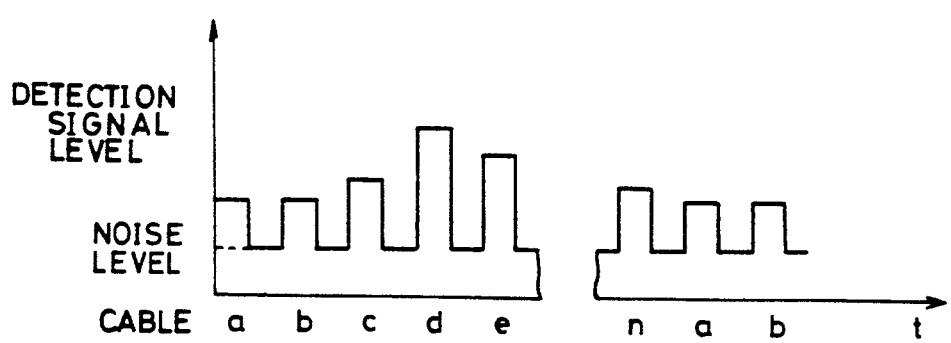
FIG. 9 illustrates an example of the output signal from the magnetic field detector when a plurality of the loop cables are excited at different timing.

In this case, an arbitrary loop cable 28i can be detected by, for example, a method arranged in such a manner that a counter is provided for the position calculator 40 so as to count the detection signals supplied from the magnetic field detector. The same can be detected by making the magnetic field producer 24 side and the magnetic field detector 36 side to be in synchronization with each other. A pattern for exciting the loop cable is shown in FIG. 8. Assuming that the level of the detection signal transmitted from the magnetic field detector due to the magnetic field produced by each of the loop cables is as shown in FIG. 9, the position calculator 40 counts the sequential number of the detection signal displaying the highest level from the moment at which the detection signals of the same intensity have been received so as to specify the loop cable 28i.

As described above, according to this mode, the control unit 50 sequentially switches over the loop cables 28a to 28e so that they generate the magnetic fields at different moments. Therefore, the loop cable which is producing the magnetic field can easily be identified so that an accurate amount of displacement can be obtained.

Figure 10:
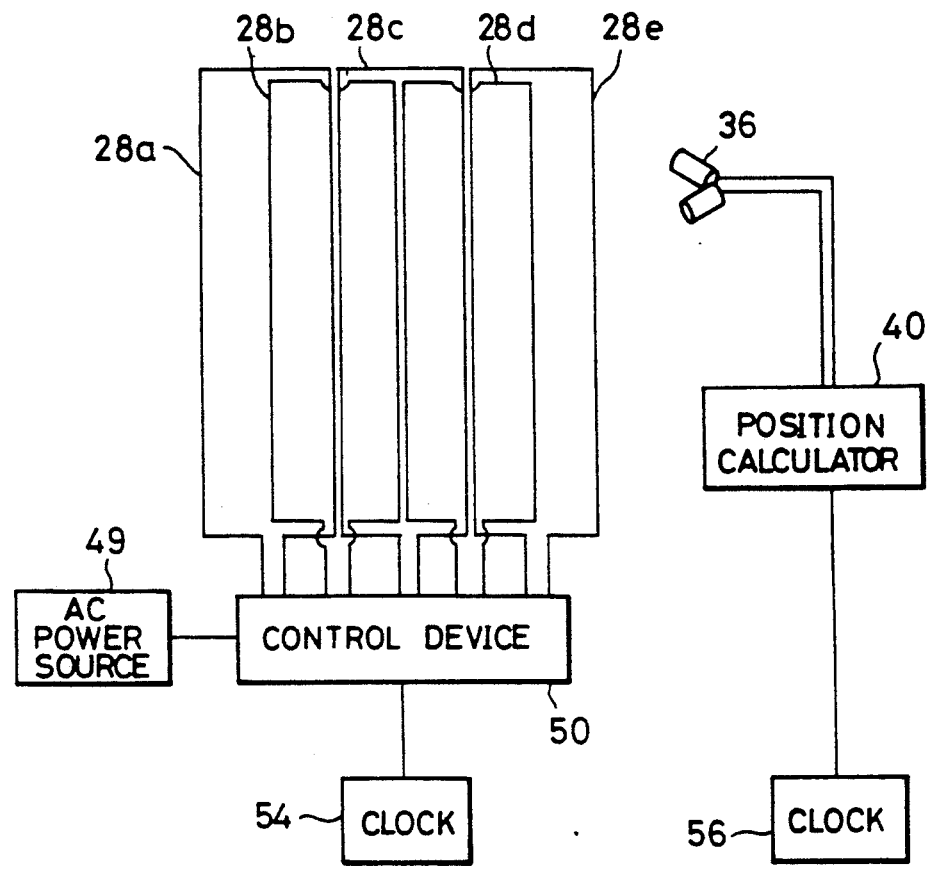
FIG. 10 illustrates a fourth mode of the position detection apparatus.

FIG. 10 illustrates a fourth mode. Referring to FIG. 10, the control unit 50 comprises a switching portion composed of a multiplexer and a relay and a control portion (each of which is omitted from illustration) for controlling the switching portion. The loop cables 28a to 28e and the single AC power source 49 are respectively connected to the switching portion. Clocks 54 and 56 are connected to the control portion of the control unit 50 and the position calculator 40. As a result, the excitation of each of the loop cables 28a to 28e made by the control unit 50 and introduction of the detection signal transmitted from the magnetic field detector 36 performed by the position calculator 40 are performed in synchronization with each other.

According to this mode thus-constituted, by performing the time adjustment of the clocks 54 and 56 to be the same and by synchronizing the period and the space in which the control unit 50 transmits the switching control signal to the switching portion and the period and the space in which the position calculator 40 receives the detection signal from the magnetic field detector 36, the loop cable which is producing the magnetic field can easily be specified.

Figure 11:
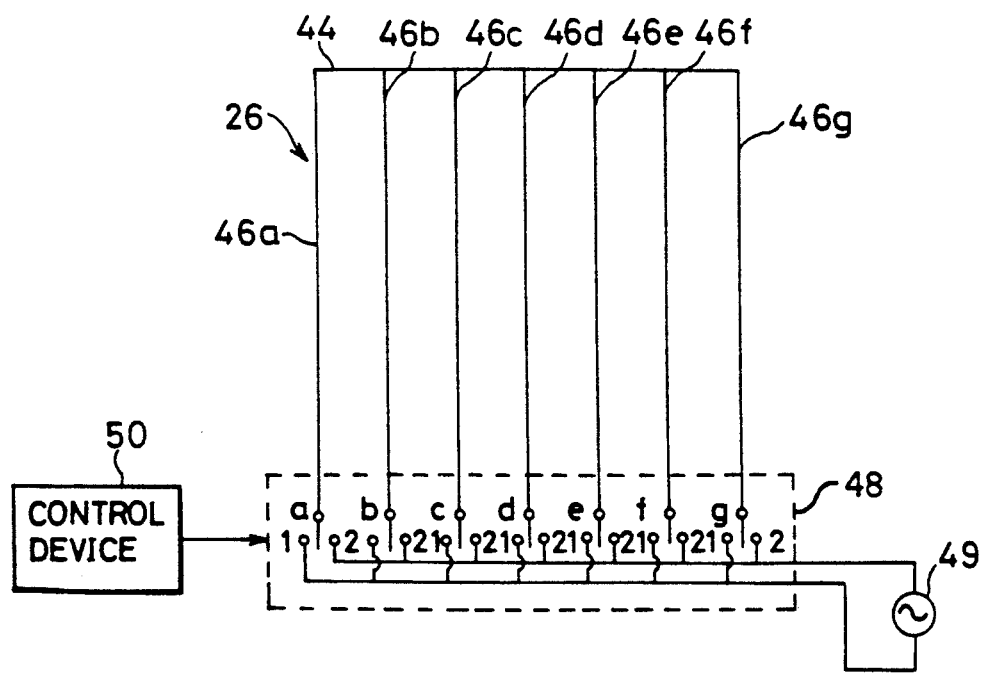
FIG. 11 illustrates a fifth mode of the position detection apparatus.

FIG. 11 illustrates a fifth mode. According to this mode, the switch 48 shown in FIG. 5 is connected to the control unit 50 so that the control unit 50 controls the switching operation of the switch 48.

Figure 12:
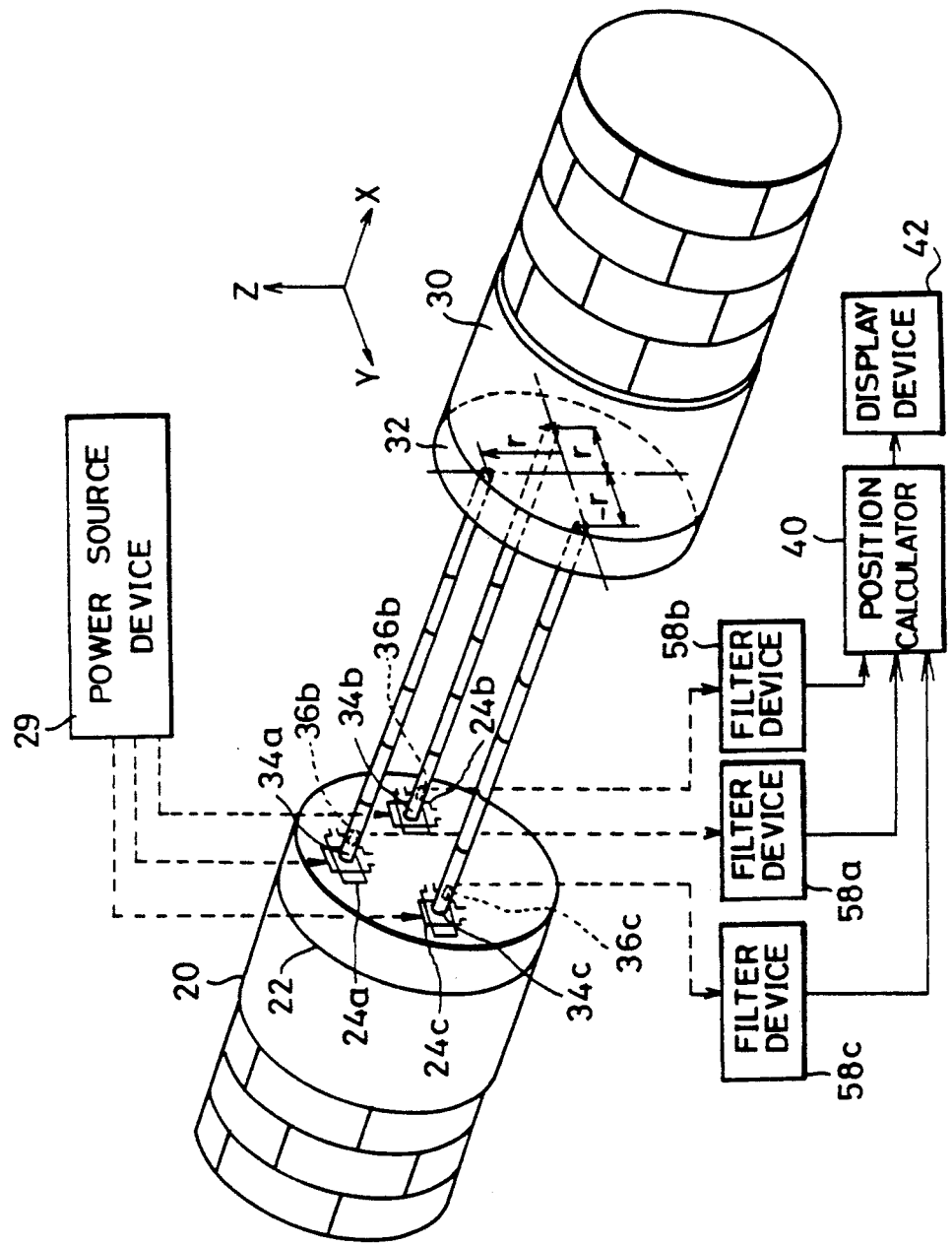
FIG. 12 illustrates the overall structure of a sixth mode of the position detection apparatus.
Figure 13:
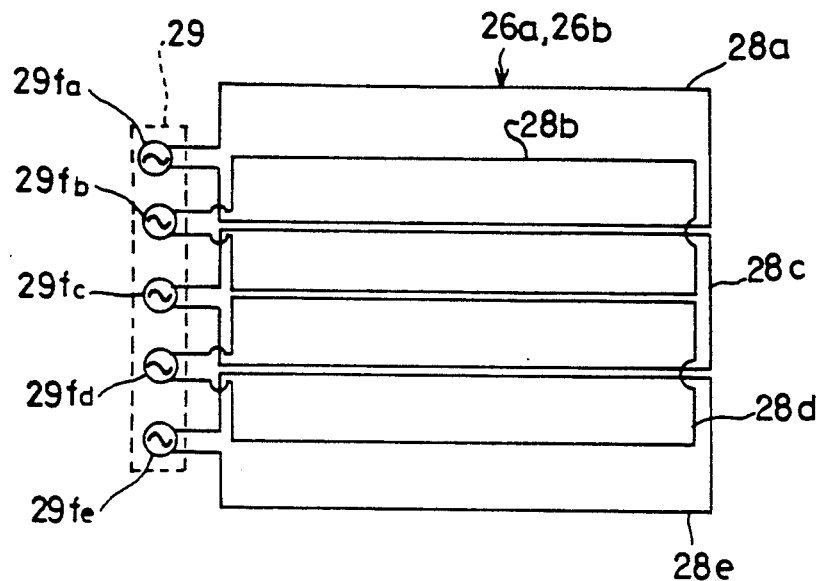
FIG. 13 illustrates the detailed structure of the magnetic field producer according to the sixth mode.
Figure 14:
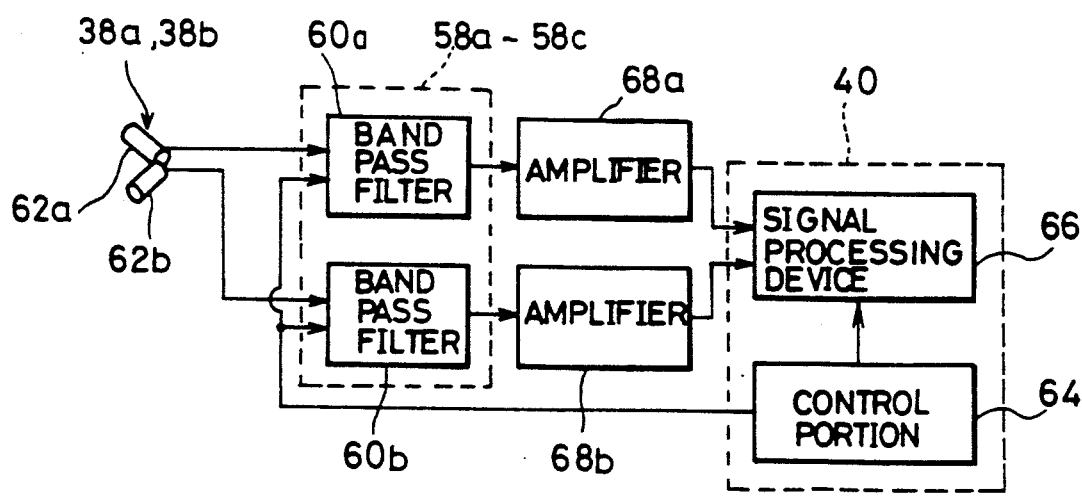
FIG. 14 is a block diagram which illustrates a system for processing the detection signal according to the sixth mode.
Figure 15:
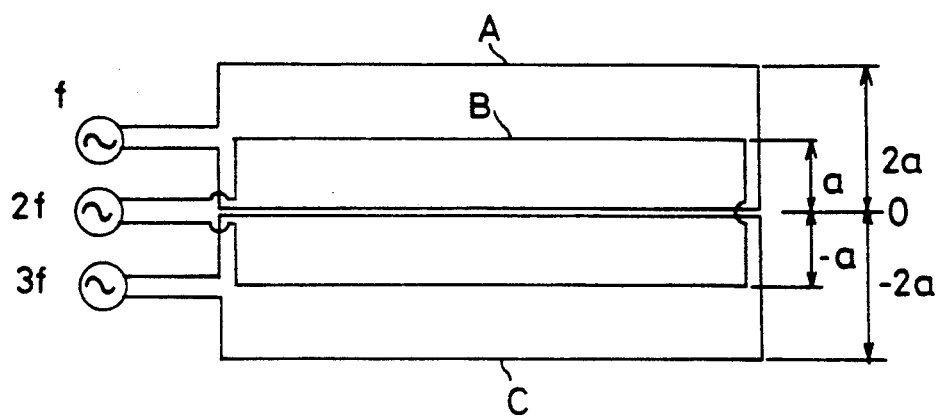
FIG. 15 illustrates the configuration of the loop cable for illustrating the relationship between the exciting frequency and the detection signals according to the sixth mode.

FIGS. 12 to 14 illustrate a sixth mode. Referring to these drawings, the power source device 29 is constituted by AC power sources 29fa to to 29fe each having different output frequencies. The loop cables 28a to 28e which constitute the loop portions 26a and 26b are connected to the above-described AC power sources 29fa to 29fe the detection signal transmitted from the magnetic field detectors 36a, 36b and 36c are supplied to the position calculator 40 via filter devices 58a to 58c (see FIG. 12).

The filter devices 58a to 58c are, as shown in FIG. 14, composed of band pass filters 60a and 60b. Detection coils 62a and 62b which constitute the Y-axis directional detection portion 38a or the Z-axis directional detection portion 38b are connected to the input sides of the above-described band pass filters 60a and 60b. In addition, a control portion 64 of the position calculator 40 is connected to the band pass filters 60a and 60b so that the central frequency of the filter can be changed in response to a control signal transmitted from the control portion 64. Furthermore, amplifiers 68a and 68b are connected to the output side of the band pass filters 60a and 60b so that the output signals from the amplifiers 68a and 68bare received by the position calculator 40.

The position calculator 40 is composed of the control portion 64 and a signal processing portion 66 so that the signal processing portion 66 receives detection signals from the magnetic field detectors 36a, 36b and 36c via the band pass filters 60a and 60b and the amplifiers 68a and 68b in response to a timing signal transmitted from the control portion 64. As a result, the position calculator 40 calculates the relative distance between the underground excavator 30 and the underground excavator 20, the Y-axis direction, the amount displacement in the Z-axis direction, the pitching angle made from the axial line (X-axis) of the underground excavator 20 and the rolling angle in accordance with the above-described detection signals and the amount of excavation realized by each of the boring devices 34a, 34b and 34c so as to transmit the results of the calculations to be displayed on it.

According to this mode constituted as described above, the central frequencies of the band pass filters 60a and 60b are sequentially changed so as to be made to coincide with the transmitted frequencies from the AC power sources 29fa to 29fe by the action of the control portion 64 of the position calculator 40. The detection signals transmitted from the magnetic field detectors 36a, 36b and 36c which have passed through the band pass filters 60a and 60b are amplified by the amplifiers 68a and 68b before they are transmitted to the signal processing portion 66 of the position calculator 40.

The signal processing portion 66, receives the frequency selection signals transmitted from the control portion 64 to the band pass filters 60a to 60b. In synchronization with the receipt of the frequency selection signals, it reads the detection signals transmitted from the amplifier 68a and 68b so as to compare the detection signals thus-read. As a result, a signal displaying the highest level is selected. The position calculator 40 detects the loop cable 28i which is producing the magnetic field with which the signal displaying the highest level is detected by the Y-axis directional detection portion 38a. As a result, the position of the detected loop cable 28i with respect to the center of the loop portion 26a is calculated.

As described above, the AC power sources 28fa to 29fe have different output frequencies and also the magnetic fields produced by the loop cables 28a to 28e are AC magnetic fields having different frequencies. As a result, the detection signals transmitted from the magnetic field detectors 36a, 36b and 36c for detecting the intensity of the magnetic field in accordance with the induced electromotive force of the detection coil are changed in their levels by the frequency of the magnetic fields produced by the loop cables 28a to 28e.

Figure 16:
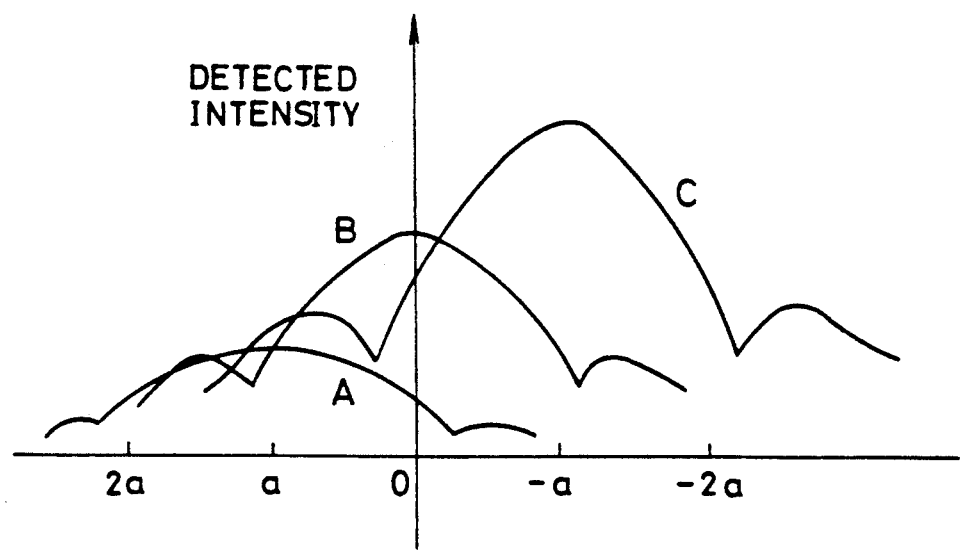
FIG. 16 illustrates the intensity distribution of the detection signal due to the loop cable shown in FIG. 15.

For example, in a case where loop cables A, B and C, the width of each of which is 2a, are excited with AC of f (=276 Hz), 2f (=552 Hz) and 3f (=828 Hz), the detection signals due to the magnetic fields produced by the loop cables A, B and C are as shown in FIG. 16. Therefore, when the loop cables A, B and C are simultaneously excited, the detection of the loop cable 28i in accordance with only the level of the detection signal cannot be performed accurately even if the band pass filters 60a and 60b are used because the intensity of the detection signal due to the magnetic field of each of the loop cables B and C sometimes becomes larger if the magnetic field detector is within the range of the loop cable A. Therefore, the magnetic field produced by each of the loop cables is made to be a size which is in inverse proportion to the exciting frequency or the detection signal transmitted from the magnetic field detector is made to be a level which is in inverse proportion to the exciting frequency.

Figure 17:
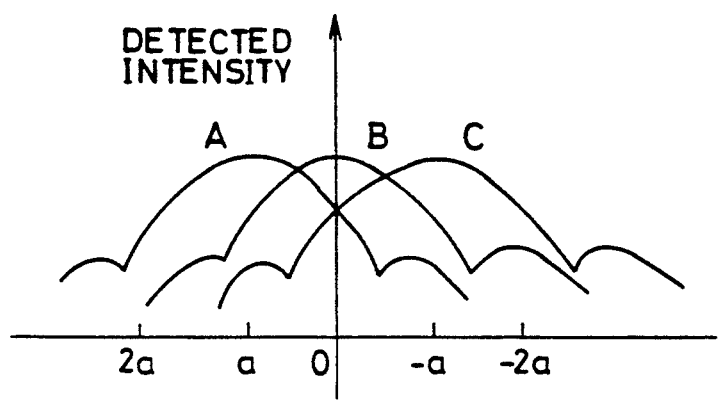
FIG. 17 illustrates the intensity distribution of the detection signal when the intensity of the magnetic field produced by the loop cable shown in FIG. 15 is adjusted.
Figure 18:
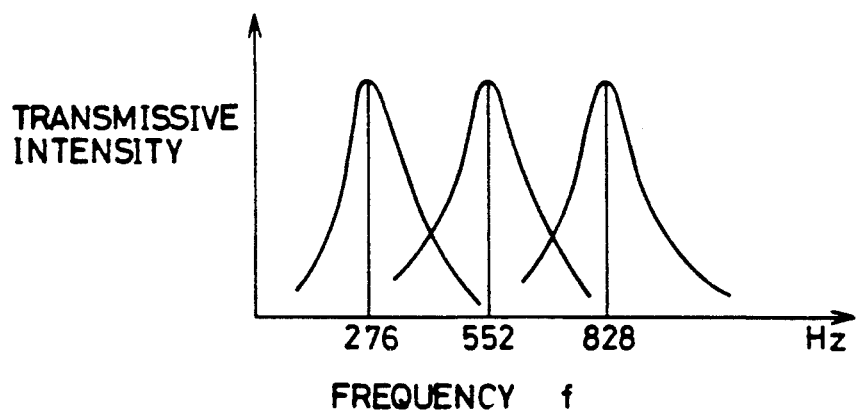
FIG. 18 illustrates the intensity of the intensity distribution detection signal after it has passed through a band pass filter.

As a result of the structure thus-constituted, the intensity distribution of the detection signals are made as shown in FIG. 17. Therefore, the intensity of the detection signals which have passed through the band pass filters 60a and 60b are made as shown in FIG. 18. As a result the loop cable the magnetic field of which generates the highest level detection signal can easily be detected. Therefore, the loop cable 28i can assuredly be specified.

As described above, according to this mode, the loop cables 28a to 28e are excited with different frequencies and the detection signals which correspond to the exciting frequencies are picked up by the band pass filters 60a and 60b in accordance with the output signals from the magnetic detectors 36a, 36b and 36c. Therefore, even if the loop cables 28a to 28e are simultaneously excited, the loop cable which is producing the magnetic field with which the highest level detection signal is produced can easily be identified.

Figure 19:
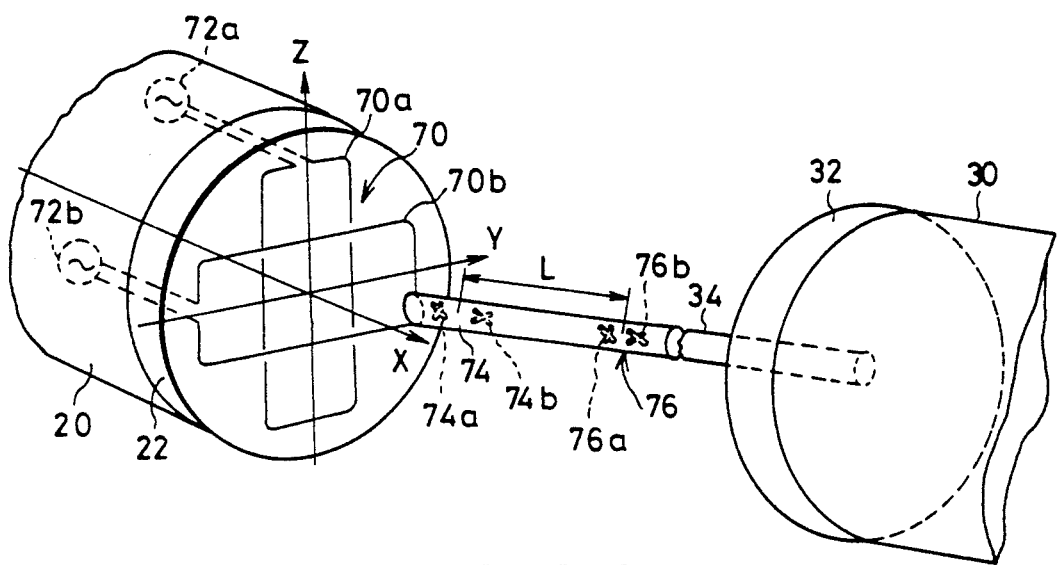
FIG. 19 illustrates a seventh mode of the position detection apparatus.

FIG. 19 illustrates a seventh mode. Referring to FIG. 19, a magnetic field producer 70 provided for the underground excavator 20 is composed of a pair of rectangular signal transmission loop cables 70a and 70b which are positioned to be perpendicular to each other. Each of the signal transmission loop cables 70a, 70b is positioned in such a manner that its central portion coincides with the central portion of the underground excavator 20 and it is connected to the proper AC power source 72a or 72b.

The other underground excavator 30 has the small-diameter boring device 34 at the central portion of the front portion thereof. The boring device 34 includes a first magnetic field detector 74 at a portion adjacent to the leading portion thereof and a second magnetic field detector 76 is provided in the rear of it at a predetermined distance L.

The first magnetic field detector 74 and the second magnetic field detector 76 are disposed along the axial line of the boring device 34 and are composed of Y-axis directional displacement detectors 74a and 76a and Z-axis directional displacement detection portions 74b and 76b. Each of the detection portions 74a, 74b, 76a and 76b are composed of a pair of receiving coils which are disposed to be perpendicular to each other. The Y-axis directional displacement detection portions 74a and 76a are disposed to be capable of detecting the intensity of the magnetic field produced by a pair of major sides of the signal transmission loop cable 70a so as to transmit electric signals which correspond to the detected intensity of the magnetic field to a calculating device omitted from the drawing. The Z-axis directional displacement portions 74b and 76b are disposed to be capable of detecting the intensity of the magnetic field produced by a pair of the major sides of the signal transmission cable 70b so as to transmit electric signals which correspond to the detected magnetic field to the calculating device.

According to this mode, a pair of the receiving coils constituting the Y-axis directional displacement detection portion 74a detect the intensity of the magnetic field produced by the major side of the signal transmission cable 70a so as to supply the detection signal to the calculating device. The calculating device, as disclosed in Japanese Patent Application No. 1-65352 filed by the assignee of the present invention, calculates the Y-directional displacement y of the receiving coil (the first magnetic field detector 74) with respect to Z-axis by the following equation:

$$y_1 = 1 \ (V_2 - V_1)/2(V_1 + V_2) \tag{2}$$

where $V_1$ and $V_2$ are induced electromotive force generated in a pair of the receipt coils which constitute the Y-axis directional displacement detection portion 74a and 1 is the distance from the receiving coil and the surface on which the signal transmission loop cable 70a is disposed.

The calculating device similarly obtains Z-axis directional displacement $z_1$ of the first magnetic field detector 74 with respect to Y-axis in accordance with the detection signal transmitted from the Z-axis directional displacement detection portion 74b of the first magnetic field detector 74. Furthermore, it obtains Y-axis and Z-axis directional displacements $y_2$ and $z_2$ of the magnetic field detector 76. Then, the calculating device calculates the inclination angle of the boring device 34 with respect to the underground excavator 20 in accordance with obtained $y_1$, $y_2$, $z_1$ and $z_2$.

Figure 20:
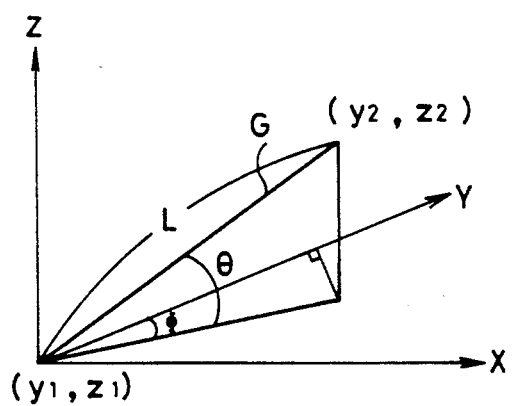
FIG. 20 illustrates a method for determining the angle of inclination of the underground excavator according to the seventh mode with respect to the reference position.

For example, as shown in FIG. 20, assuming that an angle made by segment (the axial line of the boring device 34) G which connects the first magnetic field detector 74 and the second magnetic field detector 76 from XY-plane is $\theta$ and an angle made by segment G from the YZ-plane is $\Phi$, the above-described angles $\theta$ and $\Phi$ can be obtained as follows:

$$\theta = \sin^{-1}\{(z_2 - z_1)/L\} \tag{3}$$

$$\Phi = \cos^{-1}\{(y_2 - y_1)/L\} \tag{4}$$

Therefore, the inclination angle and the direction of the inclination of the underground excavator 30 the central axis of which coincides with the boring device 34 with respect to the underground excavator 20 can be detected. Furthermore, the distance between the two excavators 20 and 30 can be obtained from the amount of excavation made until the leading portion of the boring device 34 reaches the front surface of the underground excavator 20. In addition, the Y and Z-directional amount of displacement between the center of the underground excavator 20 and that of the underground excavator 30 can accurately be obtained.

Figure 21A:
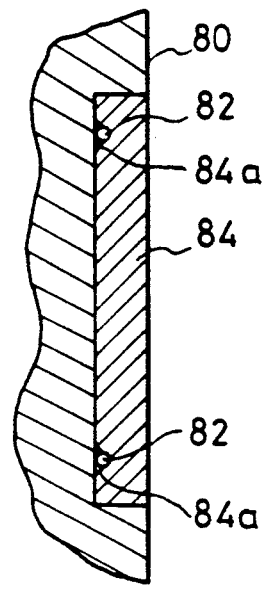
FIG. 21(A) is a cross sectional view which illustrates a first mode of a magnetic producing cable for a position detection apparatus.
Figure 21B:
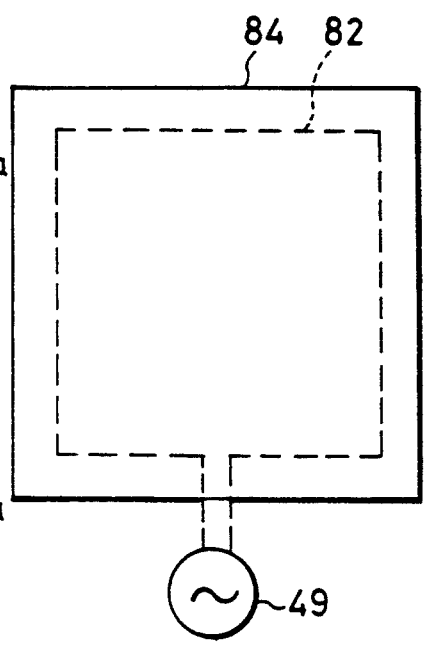
FIG. 21(B) is a front elevational view of the same.

FIG. 21(A) is a cross sectional view which illustrates a first mode of a magnetic field producing cable for a position detection apparatus according to the present invention. FIG. 21(B) is a front elevational view of the same.

According to this mode, a rectangular counterbore is formed at a predetermined position of a front surface 80 of the underground excavator, the counterbore having, in the bottom surface thereof, a magnetic field producing cable 82 is disposed. Furthermore, the magnetic field cable 82 is covered with a plate-like cover 84. The cover 84 is made of, for example, SUS304 and formed into a rectangular shape, the cover 84 having a groove 84a in which the magnetic field producing cable 82 is accommodated. The cover 84 is, at a plurality of portions thereof, secured to the underground excavator 80 by bolts made of stainless steel and omitted from illustration.

As described above, this mode is arranged in such a manner that the magnetic field producing cable 82 is covered with the cover 84 so that wear and disconnection of the magnetic field producing cable 82 can be prevented. Furthermore, since the cover 84 is made of non-magnetic material, the restriction of the magnetic field intensity in the forward direction from the underground excavator can be significantly reduced so that an effective magnetic field can be produced for the magnetic field detector provided for the confronting underground excavator.

Figure 22:
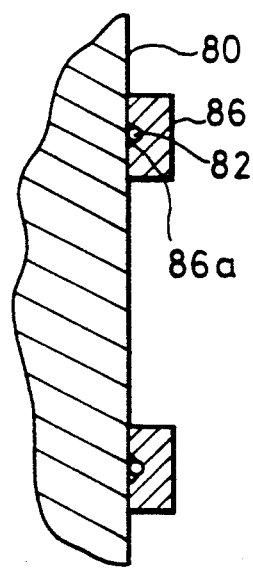
FIG. 22 is a cross sectional view which illustrates a second mode of the magnetic field producing cable.

FIG. 22 is a cross sectional view which illustrates a second mode of the magnetic field producing cable. According to this mode, no counterbore is formed in the front surface 80 of the underground excavator but the magnetic field producing cable 82 is directly disposed in the front surface 80. Furthermore, the magnetic field producing cable 82 is covered with a cover rectangular rod 86 having a groove 86a.

Figure 23:
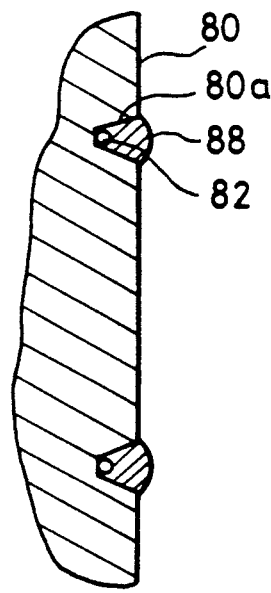
FIG. 23 is a cross sectional view which illustrates a third mode of the magnetic field producing cable.

FIG. 23 illustrates a third mode of the magnetic field producing cable which is constituted by mixing the above-described described first mode and the second mode. That is, the groove 80a is formed in only the front surface 80 of the underground excavator and the magnetic field producing cable 82 is embedded in the groove 80a. The embedding of it is performed in such a manner that the magnetic field producing cable 82 is disposed in the groove 80a and a stainless steel member 88 having the same cross sectional shape as that of the groove 80a is cold-fit into the groove 80a.

The above-described cover may be made of non-magnetic material except for stainless steel. Furthermore, the cover may be secured to the front surface 80 of the underground excavator by welding.

Figure 24:
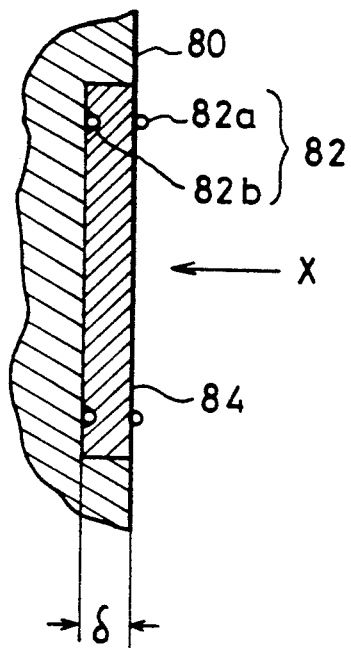
FIG. 24 is a cross sectional view which illustrates a fourth mode of the magnetic field producing cable.

FIG. 24 is a cross sectional view which illustrates a fourth mode of the magnetic field producing cable.

Figure 25:
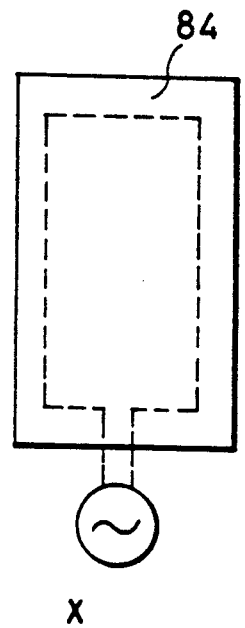
FIG. 25 is an X-directional view of FIG. 24.

The magnetic field producing cable 82 is composed of a first rectangular loop 82a and a second rectangular loop 82b. The first rectangular loop 82a is disposed on the front surface 80 of the underground excavator or the structure to appear outside. The second rectangular loop 82b is, as shown in FIGS. 24 and 25, disposed at a position at which it can be projected on the back side of the first rectangular loop 82a. Furthermore, the second rectangular loop 82b is covered with a cover 84 the thickness of which is $\delta$.

The above-described rectangular loops 82a and 82b are connected to the power source so that their right and left confronting sides shown in FIG. 25 respectively generate symmetric magnetic fields in the upward direction from the drawing sheet. However, the exciting electric currents are not simultaneously supplied to the rectangular loops 82a and 82b. The above-described electric current many be a DC current, an AC current or pulse current.

As a result of the structure thus-arranged, if the first rectangular loop 82a is disconnected, the electric current is supplied to the second rectangular loop 82b. Therefore, the position detection can be performed as desired and a problem of impossible detection can be prevented.

It can be considered that the gap $\delta$ between the first rectangular loop 82a and the second rectangular 82b does not substantially affect the detection operation of the magnetic field detector (magnetic sensor). The calculation of the amount of eccentricity is, as described above, performed by comparing the magnitude of the symmetric magnetic field detected by the magnetic sensor. Therefore, by previously storing the magnetic field intensity corresponding to the gap $\delta$ in the storage means so as to be added/subtracted to and from the intensity difference, the amount of eccentricity can be accurately detected.

Figure 26:
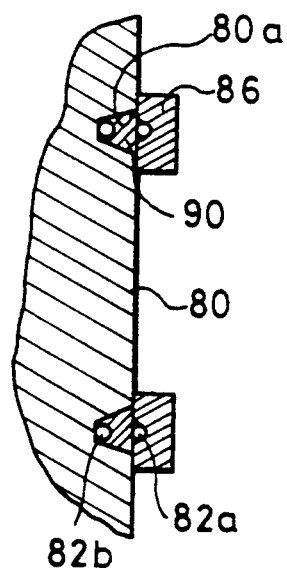
FIG. 26 is a cross sectional view which illustrates a fifth mode of the magnetic field producing cable.

FIG. 26 is a cross sectional view which illustrates a fifth mode of the magnetic field producing cable. Referring to FIG. 26, the second rectangular loop 82b is accommodated in the groove 80a formed in the front surface 80 of the underground excavator or the structure. Furthermore, a non-magnetic cover rod (for example, a stainless steel rod) 90 is welded on it. Furthermore, the first rectangular loop 82a is disposed above the nonmagnetic cover rod 90 and as well as on the front surface of the underground excavator or the structure. In addition, a non-magnetic cover rod 86 with a groove and made of stainless steel is placed to cover it.

Figure 27:
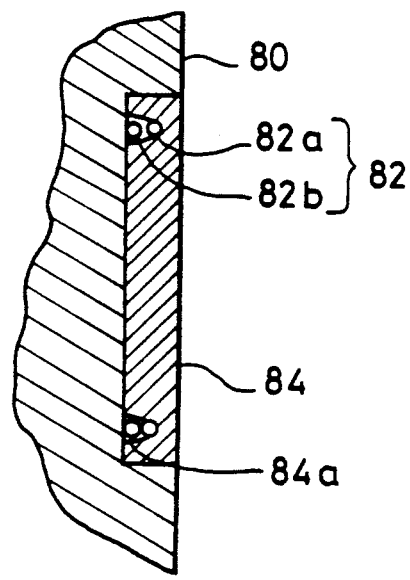
FIG. 27 is a cross sectional view which illustrates a sixth mode of the magnetic field producing cable.
Figure 28:
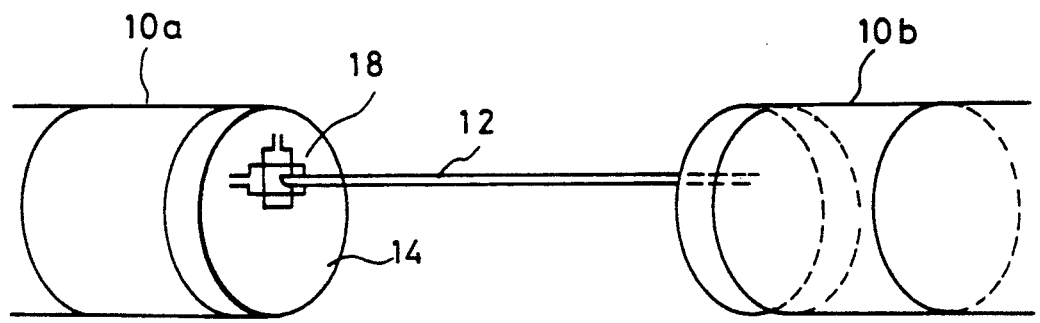
FIG. 28 illustrates a conventional apparatus for detecting the position of an underground excavator.
Figure 29:
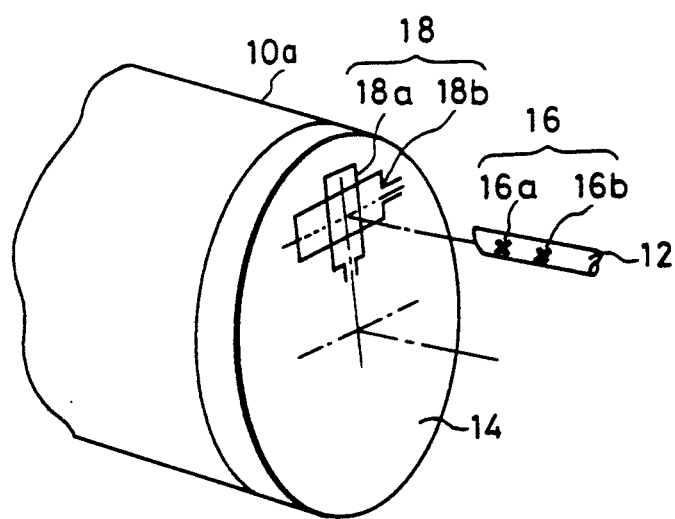
FIG. 29 illustrates the detailed structure of a portion of the same.
Figure 30:
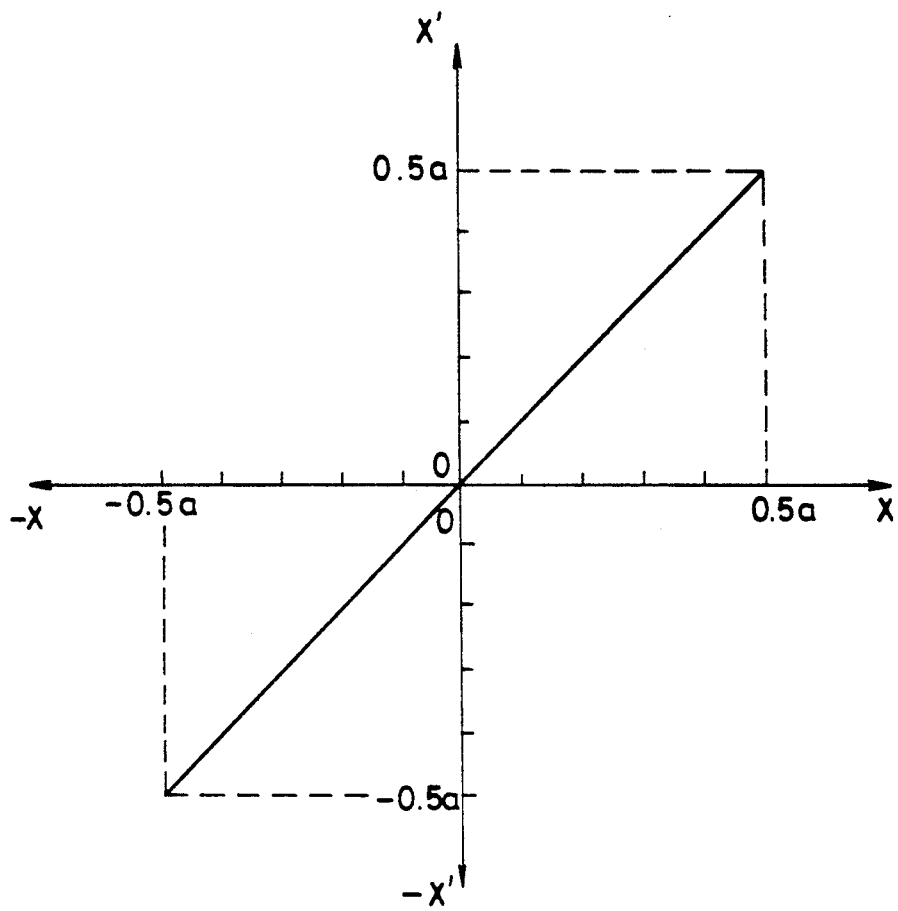
FIG. 30 is graph which illustrates the relationship between the eccentricity amount obtained by measuring the magnetic field from a parallel conductor which can be considered to have an infinite length and the actual measured eccentricity amount.

FIG. 27 is a cross sectional view which illustrates a sixth mode of the magnetic field producing cable. According to this mode, the second rectangular loop 82b and the first rectangular loop 82a are sequentially accommodated in a rectangular groove formed in the front surface 80 of the underground excavator or the structure. Then, the platelike non-magnetic cover 84 with a groove 84a formed into a rectangular shape is accommodated in the rectangular groove of the front surface 80. In addition, its peripheral portion is welded to the underground excavator or the structure. As a result of the structure according to this mode, the possibility of the disconnection of each of the rectangular loops 82a can furthermore assuredly prevented. Another effect can be obtained in that the intensity of the symmetric magnetic field produced by the rectangular loop can be maintained.

INDUSTRIAL APPLICABILITY

As described above, with the position detection device according to the present invention, the position of the underground excavator can be accurately obtained so that the two underground excavators which have excavated sediment in directions to confront each other can be accurately coupled to each other. In addition, the magnetic field producing cable according to the present invention is able to prevent wear and the disconnection. Therefore, a problem of the impossible detection taken place in the position detection apparatus can be prevented.

What is claimed is:

1. An apparatus for detecting the position of an underground excavator comprising:
   a magnetic field producer disposed at one of the leading portion of said underground excavator and a position in front of said underground excavator, said position in front of said underground excavator serving as a reference position, said magnetic field producer being constituted by a plurality of rectangular loops extending parallel to one another with adjacent ones of said rectangular loops overlapping each other;
   a magnetic field detector disposed at the remaining one of said leading portion of said underground excavator and said reference position, said magnetic field detector being for the detection of the magnetic field produced by each of said rectangular loops;

a propulsive machine for moving forwardly at least one of said magnetic field detector and said magnetic field producer so as to bring them closer to each other; and a position calculator for calculating the relative position of said underground excavator with respect to said reference position in accordance with the forward movement distance made by said propulsive machine and a detection signal supplied from said magnetic field detector.

2. An apparatus for detecting the position of an underground excavator according to claim 1, further comprising a power source and a plurality of switches, wherein said magnetic field producer is composed of a common line and a plurality of parallel branch lines, each of said branch lines having a first end portion connected to said common line and another end portion connected through a respective one of said switches to said power source.

3. An apparatus for detecting the position of an underground excavator according to claim 1, further comprising a power source, and a control unit, wherein a plurality of said rectangular loops are connected to said control unit which sequentially connects them to said power source to sequentially excite them.

4. An apparatus for detecting the position of an underground excavator according to claim 3, wherein said rectangular loops are covered with non-magnetic material.

5. An apparatus for detecting the position of an underground excavator according to claim 1, further comprising:

a power source for exciting each of said rectangular loops at different frequencies; and a filter to which a detection signal is supplied from said magnetic field detector and which passes a detection signal having a frequency which corresponds to the frequency which has excited a respective one of said rectangular loops; and wherein said position calculator calculates the relative position of said underground excavator with respect to said reference position in accordance with the forward movement distance made by said propulsive machine and a detection signal, supplied from said magnetic field detector, which has passed through said filter.

6. An apparatus for detecting the position of an underground excavator according to claim 5, wherein said position calculator has a control portion for switching the central frequency of said filter.

7. An apparatus for detecting the position of an underground excavator according to claim 6, wherein said rectangular loops are covered with non-magnetic material.

8. An apparatus for detecting the position of an underground excavator according to claim 1, wherein said rectangular loops are covered with non-magnetic material.

9. An apparatus for detecting the position of an underground excavator according to claim 1, wherein said magnetic field detector comprises a first magnetic field detector and a second magnetic field detector, said second magnetic field detector being disposed to the rear of said first magnetic field detector.

10. An apparatus for detecting the position of an underground excavator according to claim 9, wherein said rectangular loops are covered with non-magnetic material.

11. An apparatus for detecting the position of an underground excavator according to claim 1, wherein said magnetic field producer and a second magnetic field producer are positioned on the front surface of said underground excavator for producing symmetric magnetic fields in the forward direction which are respectively perpendicular to said front surface, wherein said second magnetic field producer comprises a plurality of rectangular loops extending parallel to one another with adjacent ones thereof overlapping each other, and wherein said second magnetic field producer is disposed at a position to the rear of the first mentioned magnetic field producer, and wherein the two magnetic field producers are independently supplied with electric currents.

12. An apparatus for detecting the position of an underground excavator according to claim 11, wherein the first mentioned magnetic field producer and said second magnetic field producer are covered with non-magnetic material.

13. An apparatus for detecting the position of an underground excavator according to claim 1, wherein said underground excavator is an underground structure.

14. An apparatus for detecting the position of an underground excavator comprising:

a magnetic field producer provided at one of said underground excavator and a reference position;

a first magnetic field detector provided at the remaining one of said underground excavator and said reference position to detect the magnetic field produced by said magnetic field producer;

a second magnetic field detector disposed to the rear of said first magnetic field detector to detect the magnetic field produced by said magnetic field producer; and a propulsive machine provided for at least one of said underground excavator and said reference position to move at least one of said magnetic field producer and said magnetic field detectors so as to bring said magnetic field producer and said magnetic field detectors closer to each other.

15. An apparatus for detecting the position of an underground excavator according to claim 14, wherein said magnetic field producer is covered with non-magnetic material.

16. A magnetic field producing apparatus for detecting the position of an underground excavator which acts to establish a connection under the group, comprising said underground excavator, and a magnetic field producing cable attached to the front surface of said underground excavator, said magnetic field producing cable being covered with a non-magnetic metal cover so that wear and disconnection of the magnetic field producing cable can be prevented while reducing any restriction of the magnetic field intensity in the forward direction from the underground excavator.

17. A magnetic field producing apparatus for detecting the position of an underground excavator comprising said underground excavator, and on the front surface of said underground excavator, a first rectangular loop and a second rectangular loop for producing symmetric magnetic fields in the forward direction which are respectively perpendicular to said front surface, wherein said second rectangular loop is disposed at a position to the rear of said first rectangular loop, and wherein said first and second rectangular loops are independently supplied with electric currents.

18. A magnetic field producing apparatus for detecting the position of an underground excavator according to claim 17, wherein said underground excavator is an underground structure.

19. A magnetic field producing apparatus for detecting the position of an underground excavator according to claim 18, wherein said first rectangular loop and said second rectangular loop are covered with non-magnetic material.

20. A magnetic field producing apparatus for detecting the position of an underground excavator according to claim 17, wherein said first rectangular loop and said second rectangular loop are covered with non-magnetic material.

* * * * *

UNITED STATES PATENT AND TRADEMARK OFFICE
CERTIFICATE OF CORRECTION

PATENT NO. : 5,240,350
DATED : August 31, 1993
INVENTOR(S) : Hiroaki YAMAGUCHI et al It is certified that error appears in the above-identified patent and that said Letters Patent is hereby corrected as shown below:

Column 20, line 49, change "group," to --ground,--.

Signed and Sealed this

Fourteenth Day of December, 1993

*Attest:*

BRUCE LEHMAN

*Attesting Officer*          *Commissioner of Patents and Trademarks*